R. A. & A. E. GRISWOLD & C. B. BUSH.
BOX FOR ELECTRICAL INSTALLATIONS.
APPLICATION FILED AUG. 24, 1914.
1,175,865. Patented Mar. 14, 1916.
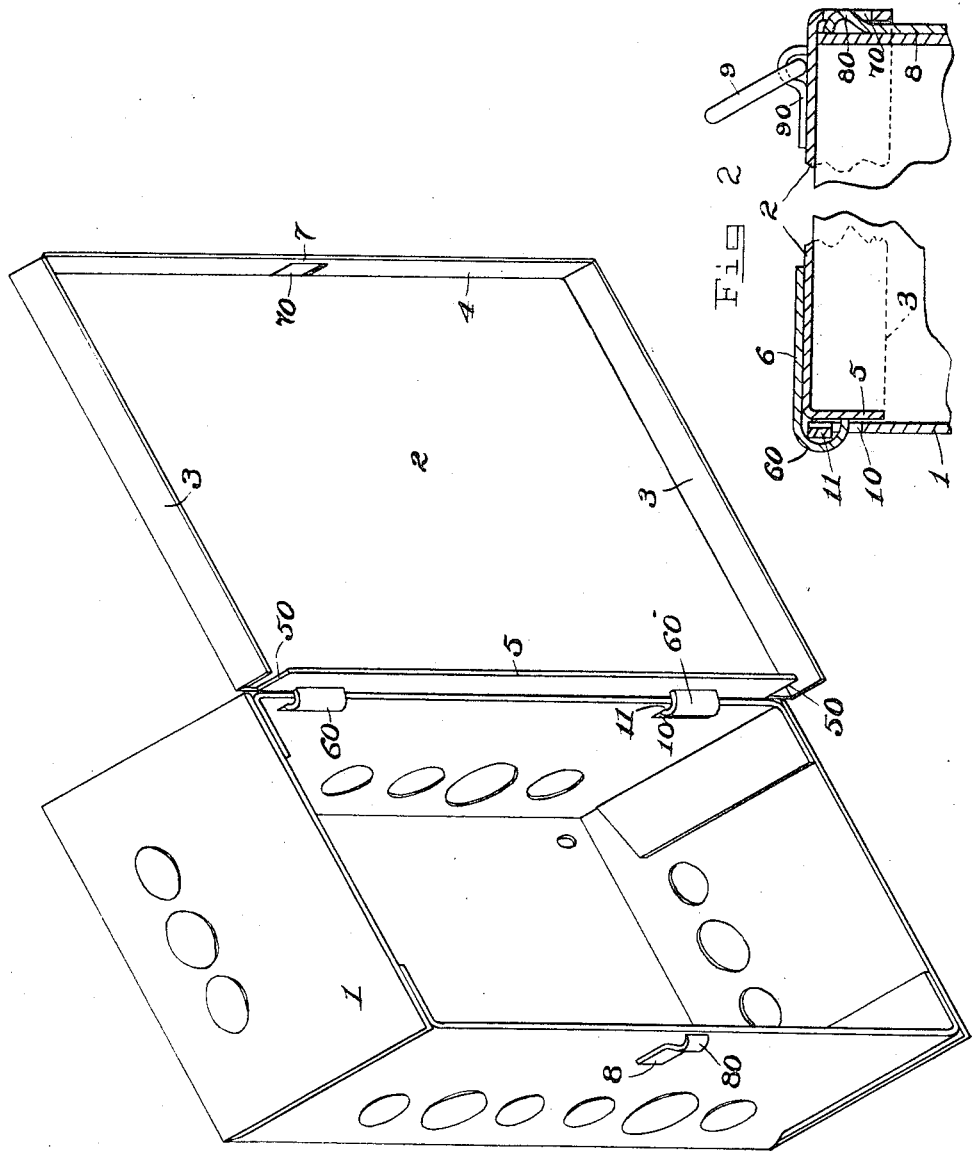
Witnesses
Chas. L. Reynolds
S. C. Whittington
Inventors
Roy A. Griswold,
Andrew E. Griswold,
Carl B. Bush,
by Henry L. Reynolds.
Attorney.

UNITED STATES PATENT OFFICE.

ROY A. GRISWOLD, ANDREW E. GRISWOLD, AND CARL B. BUSH, OF SEATTLE, WASHINGTON.

BOX FOR ELECTRICAL INSTALLATIONS.

1,175,865. Specification of Letters Patent. Patented Mar. 14, 1916.

Application filed August 24, 1914. Serial No. 858,321.

*To all whom it may concern:*

Be it known that we, ROY A. GRISWOLD, ANDREW E. GRISWOLD, and CARL B. BUSH, citizens of the United States, and residents of Seattle, King county, Washington, have invented certain new and useful Improvements in Boxes for Electrical Installations, of which the following is a specification.

Our invention relates to metallic boxes or cabinets such as are used to hold switches, cut-outs, and other like elements of electrical installations.

The object of our invention is to provide a box for uses of the character indicated, which shall be efficient, convenient, and desirable in use and which is so designed as to promote economy of construction.

Our invention comprises the novel parts and combinations of parts which will be hereinafter described and particularly pointed out in the claims.

In the accompanying drawings we have shown our invention in its present preferred form.

Figure 1 shows our box in perspective, the cover being open. Fig. 2 is a section showing in detail the construction of one of the cover hinges and the catch.

Any box intended for the purpose for which our box is to be used, must comply with the requirements of the underwriters, one of which requirements is that the cover must be flanged at least half an inch and telescope the box body on all four sides. It is frequently desired to install such boxes or cabinets by embedding them in a wall with the surface of their covers flush with the face of the wall. With the common and more obvious type of construction, the flanges of the cover telescope wholly outside the box. Such a cover cannot be hinged by the common types of hinges so as to fully swing it back if its outer surface is flush with the wall surface when it is closed. To secure a flush closed position of the cover together with a full opening ability, is one of the purposes of our invention.

The box body 1, may in all its general features, be of any suitable and desired construction. That shown is of standard and common construction, except as otherwise specifically described. The cover 2 has marginal flanges 3, 4 and 5, which telescope with the box body 1.

The flanges 3 and 4 pass outside the box body, while the flange 5, passes within the box body, in this latter respect differing from such boxes as we are familiar with. To secure this result the edge of the cover which has the flange 5 thereon, is hinged to the upper edge of the side of the box by hinges having their pivot axes without the flange 5 and approaching, as nearly as may be, the plane of the outer surface of the cover. The ends of the flange 5 are also shortened to form gaps 50, of a size to receive the end or adjacent walls of the box, when the cover is closed. With the above condition secured, the cover may have marginal flanges of any desired extent which will tightly telescope with the box on all four sides and yet may open fully when set flush in a wall.

The type of hinges employed is, to a certain extent, immaterial. The construction of hinges which we show, have some special advantages, particularly in economy of construction. In making these we form a short bar, 11, from the extreme edge portion of the body of the box side, by severing it, along its inner side, from the body of the box. This is done, preferably, by cutting away a narrow strip 10, at a point just within that edge of the box side. This bar 11 forms the pivot axis of the hinge.

The complemental part of the hinge, which is carried by the cover, consists of a metal strip 6, which is secured to the outer surface of the cover and has a projecting end bent to form an eye 60, which includes the bar 11. This is a cheap and strong construction which brings the pivot where needed, outside the flange 5 and near the outer surface of the cover. The cover may open fully with the box set flush in a wall, and the cover will also telescope the required amount.

On the other side of the box from the hinges, we place a narrow strip 8, which has its upper end bent to form a rounded projection 80, which is engaged by a bar 7, formed from the flange 4 by the punching out of the hole 70. The strip or bar 8 is preferably secured to the box only by its lower end, or that which is opposite the bend 80. This permits a certain amount of spring. It also permits bending or springing the unattached end to adjust it so as to work right with the bar 7. The bar 7 may also be sprung as needed to adjust it to fit the catch 80. Similarly the pivot bars 11 of the cover hinges may be easily sprung to properly adjust the cover.

On the upper surface of the cover close to the swinging edge, is secured a ring 9 by a small metal strip 90 which is bent at one end to form an eye for the reception of the ring. This will lie flat upon the cover and permit piling the boxes upon each other for shipment without having to remove any knob or other projection which is employed as a means of raising the cover.

Boxes employing knobs and like devices require removal of such attachments before shipment, which necessitates putting them in place before the box is used. Sometimes such small and separated parts get lost, which makes further trouble. The same advantages are associated with the type of catch by which the cover is secured. Our box is one which is finished complete at the factory, nothing being required before putting it in use. It can be compactly packed for shipping without removal of any part thereof.

What we claim as our invention and desire to patent is;

1. A box for the reception of electric fixtures having a cover flanged on all four sides, said flanges, when the cover is closed, telescoping for their full depth the sides of the box and on three sides fitting closely outside the box sides and on the fourth side fitting closely against the inner face of the box side, and hinges connecting said fourth side with the box, the pivot axis of said hinges being without the flange of the cover and substantially at the upper edge of the box side.

2. A box for the reception of electric switches having a cover flanged on all four sides to telescope with the box, said flanges on one side entering within the box and on the other sides passing without the box, the flange which enters within the box being shortened at its ends to form gaps for the reception of the adjacent walls of the box, and hinges connecting this side with the box body and having their pivot axis substantially in the planes of the outer surfaces of the flange and the box top.

In testimony whereof we have hereunto affixed our signatures this 28th day of July, 1914.

ROY A. GRISWOLD.
ANDREW E. GRISWOLD.
CARL B. BUSH.

Witnesses:
ANNA M. HULL,
GORDON F. YOUNG.